(12) United States Patent
Schunke et al.

(10) Patent No.: US 8,424,913 B1
(45) Date of Patent: Apr. 23, 2013

(54) CHASSIS FRAME OF A VEHICLE

(75) Inventors: Paul A. Schunke, New Haven, IN (US); Chester Ciesielski, Fort Wayne, IN (US); Isaac D. Branning, Arcola, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/332,722

(22) Filed: Dec. 21, 2011

(51) Int. Cl.
*B62D 21/02* (2006.01)

(52) U.S. Cl.
USPC .................................. 280/800; 280/785

(58) Field of Classification Search .................. 280/785, 280/786, 781, 797, 798, 800; 180/291, 311; 296/203.01, 205
See application file for complete search history.

(56) References Cited

U.S. PATENT DOCUMENTS

| | | | |
|---|---|---|---|
| 5,209,541 A * | 5/1993 | Janotik | 296/29 |
| 6,189,930 B1 * | 2/2001 | Kalazny | 280/781 |
| 6,199,894 B1 * | 3/2001 | Anderson | 280/638 |
| 6,299,210 B1 * | 10/2001 | Ruehl et al. | 280/800 |
| 6,398,262 B1 * | 6/2002 | Ziech et al. | 280/785 |
| 6,874,816 B2 * | 4/2005 | Herrmann et al. | 280/781 |
| 6,997,506 B2 | 2/2006 | Hecker | |
| 7,789,427 B2 | 9/2010 | Oriet | |

* cited by examiner

*Primary Examiner* — Drew Brown
(74) *Attorney, Agent, or Firm* — Jeffrey P. Calfa; Mark C. Bach; Gerald W. Askew

(57) ABSTRACT

A chassis frame has a right side rail and a left side rail running lengthwise of the frame opposite each other and joined together by at least one crossmember. A rectangular tube overlies, and has underlying support by, the top wall of the respective side rail. A right uniting member runs lengthwise of the frame for uniting the right rectangular tube and the right side rail in assembly, and a left uniting member runs lengthwise of the frame for uniting the left rectangular tube and the left side rail in assembly. Each uniting member has a horizontal flange overlying and joined to the respective rectangular tube, and a vertical flange extending downward from the respective horizontal flange and joined to the respective side rail.

15 Claims, 5 Drawing Sheets

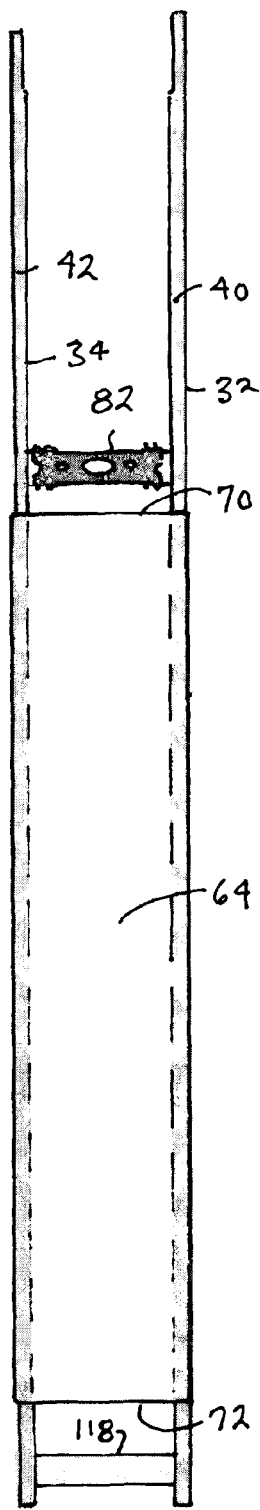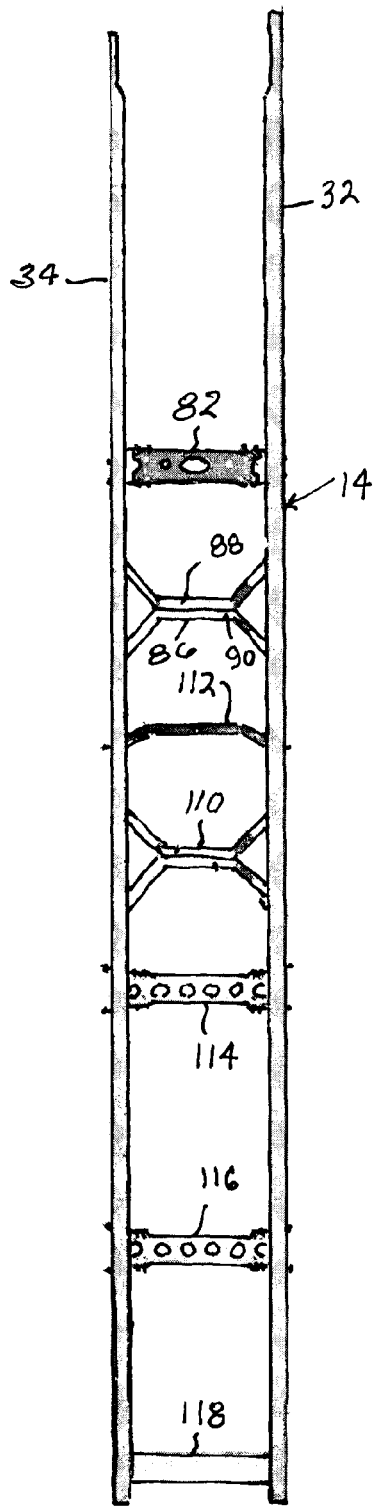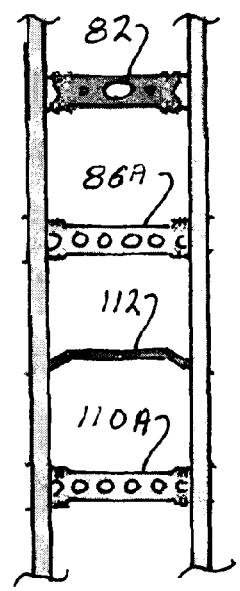
Figure 9
Figure 10
Figure 11

CHASSIS FRAME OF A VEHICLE

FIELD

This disclosure relates to a chassis frame of a motor vehicle, especially a chassis frame which is useful in certain vocational truck vehicles.

BACKGROUND

The medium and heavy duty truck manufacturing industry manufactures certain vehicles as cab chassis type vehicles. A cab chassis allows aftermarket installation of equipment which is specific to a particular vocational use of the vehicle.

Cab chassis vehicles which are to be used in certain vocations have especially long lengths and therefore comprise especially long chassis frames. When such a vehicle is parked for vocational use, various forces and/or torques may be exerted on the chassis frame, and may tend to bend and/or twist the frame. Extreme forces and/or torques exceeding design specification may even cause permanent frame deformation.

It has been a practice in the industry for an aftermarket manufacturer of certain vocational equipment which is to be installed on a cab chassis to provide that equipment with a sub-base which is intended to rigidify the chassis frame.

SUMMARY

The present disclosure relates to a chassis frame which is intended to promote overall economy in the manufacture of certain vocational vehicles by constructional features which can rigidify a long chassis frame in a manner equivalent to that provided by a sub-base in aftermarket vocational equipment currently manufactured.

Briefly, the present disclosure relates to a chassis frame comprising a right side rail running lengthwise of the frame, a left side rail running lengthwise of the frame, the right and left side rails being opposite each other and joined together by at least one crossmember, each side rail comprising a channel which has an interior bounded by a vertical wall and by horizontal top and bottom walls which extend from top and bottom of the vertical wall toward the top and bottom walls of the opposite side rail, a right rectangular tube, a left rectangular tube, each rectangular tube overlying, and having underlying support by, the top wall of the respective side rail, a right uniting member running lengthwise of the frame for uniting the right rectangular tube and the right side rail in assembly, and a left uniting member running lengthwise of the frame for uniting the left rectangular tube and the left side rail in assembly, each uniting member having a horizontal flange overlying and joined to the respective rectangular tube, and a vertical flange extending downward from the respective horizontal flange and joined to the respective side rail.

BRIEF DESCRIPTION OF THE DRAWINGS

FIG. 9 is a top plan view of another version of the chassis frame.
FIG. 10 is a top plan view of a portion of the chassis frame shown in FIG. 9, but with portions removed for the purpose of showing structure which is not seen in FIG. 9.
FIG. 11 is a fragmentary view of a portion of FIG. 10 showing a modification.

DETAILED DESCRIPTION

Figure 1:
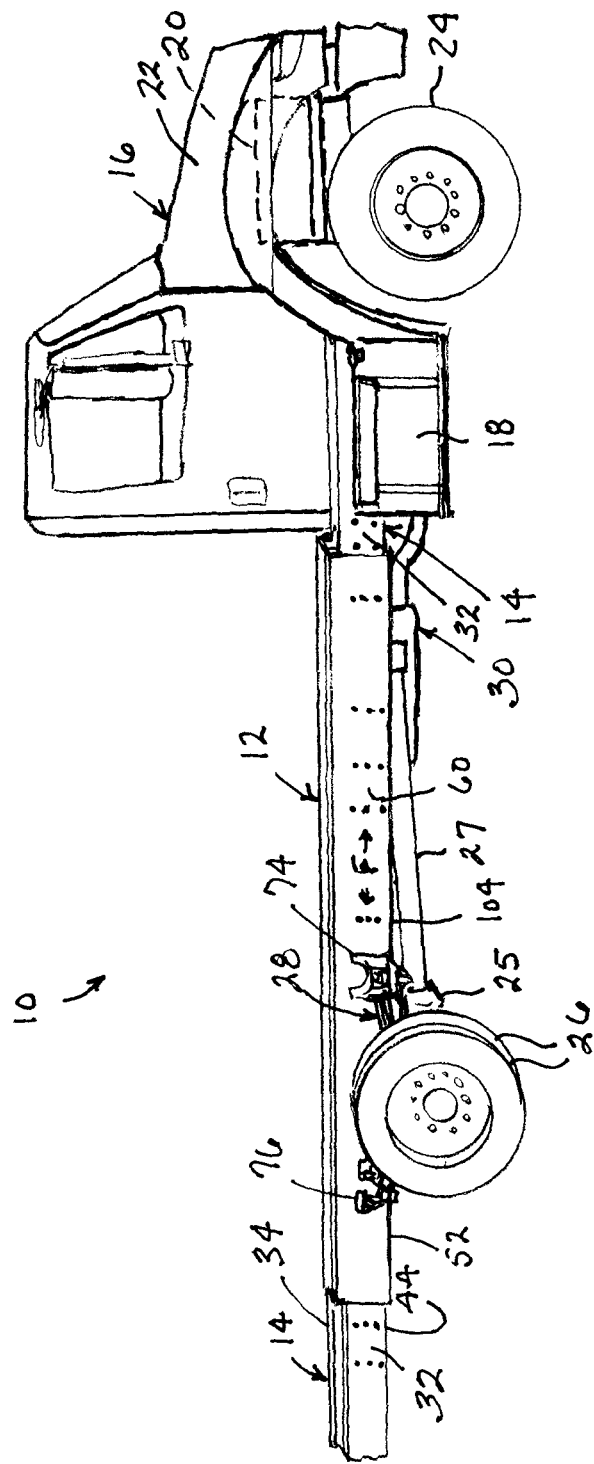
FIG. 1 is a right side view of a cab chassis of a truck vehicle.

FIG. 1 shows a right side view of a truck 10 having a chassis 12 comprising a chassis frame 14 on which various components and devices are mounted. Those components and devices include a cab 16 which has an occupant compartment for a driver of the truck, fuel tanks 18 (only the right fuel tank being seen), an engine 20 inside an engine compartment which is closed by a hood 22 which can be swung open for engine access, front steered wheels 24, a rear drive axle 25 having rear drive wheels 26, a suspension 28 for rear drive axle 25, and an engine exhaust system 30. Further detail is shown in the following FIGS. 2-8.

Chassis frame 14 comprises a right side rail 32 running lengthwise of the chassis frame and a left side rail 34 running lengthwise of the chassis frame. Right and left side rails 32, 34 are opposite each other. Each side rail 32, 34 comprises a channel which has an interior bounded by a respective vertical wall 36, 38, by a respective horizontal top wall 40, 42, and by a respective horizontal bottom wall 44, 46. Each horizontal top wall 40, 42 extends from a top of the respective vertical wall 36, 38 toward the other horizontal top wall. Each horizontal bottom wall 44, 46 extends from a bottom of the respective vertical wall 36, 38 toward the other horizontal bottom wall.

A right rectangular tube 48 overlies, and has underlying support by, top wall 40 of right side rail 32. A left rectangular tube 50 overlies, and has underlying support by, top wall 42 of left side rail 34.

A right uniting member 52 runs lengthwise of chassis frame 14 for uniting right rectangular tube 48 and right side rail 32 in assembly. A left uniting member 54 runs lengthwise of chassis frame 14 for uniting left rectangular tube 50 and left side rail 34 in assembly.

Each uniting member 52, 54 has a respective horizontal flange 56, 58 overlying and joined to the respective rectangular tube 48, 50, and a respective vertical flange 60, 62 extending downward from the respective horizontal flange 56, 58 and joined to the respective side rail 32, 34.

A rectangular plate 64 extends lengthwise of chassis frame 14. A right lengthwise margin 66 of plate 64 overlies, and has underlying support by, right rectangular tube 48. A left lengthwise margin 68 of plate 64 overlies, and has underlying support by, left rectangular tube 50.

Right and left side rails 32, 34 extend lengthwise forwardly beyond a forward lengthwise terminus 70 of plate 64, rectangular tubes 48, 50, and uniting members 52, 54. Cab 16 is mounted on side rails 32, 34 forwardly of forward lengthwise terminus 70. Right and left side rails 32, 34 extend lengthwise rearwardly beyond a rearward lengthwise terminus 72 of plate 64, rectangular tubes 48, 50, and uniting members 52, 54.

Suspension 28 comprises right side brackets 74, 76 disposed against vertical flange 60 of right uniting member 52 and fastened to chassis frame 14 by fasteners passing through aligned holes in vertical flange 60 and vertical wall 36 of right side rail 32. Suspension 28 also comprises left side brackets 78, 80 disposed against vertical flange 62 of left uniting member 54 and fastened to chassis frame 14 by fasteners passing through aligned holes in vertical flange 62 and vertical wall 38 of left side rail 34. The two brackets on each side suspend rear drive axle 25 through respective leaf spring sets.

A number of crossmembers are disposed between right side rail 32 and left side rail 34 at various locations along the length of chassis frame 14. The particular configuration shown comprises seven crossmembers, but other configurations may comprise more or fewer crossmembers.

Figure 3:
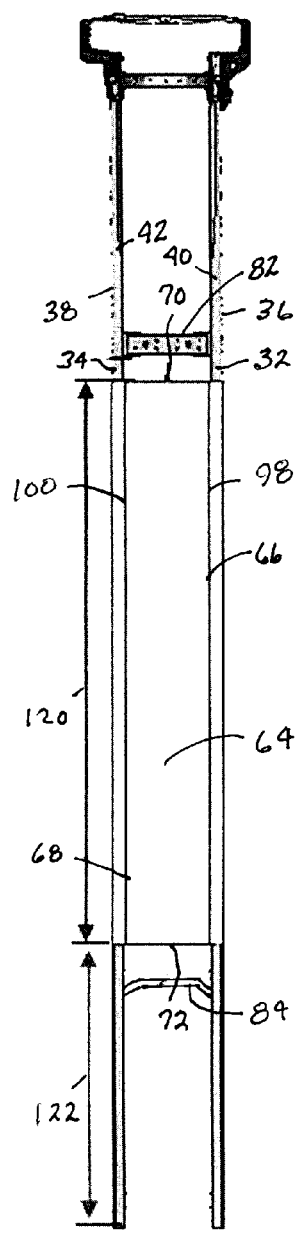
FIG. 3 is a top plan view of a chassis frame of the cab chassis.

FIG. 3 shows a first crossmember 82 fastened to right side rail 32 and left side rail 34 at a lengthwise location forward of forward lengthwise terminus 70, and a second crossmember 84 fastened to right side rail 32 and left side rail 34 at a lengthwise location rearward of rearward lengthwise terminus 72.

Figure 4:
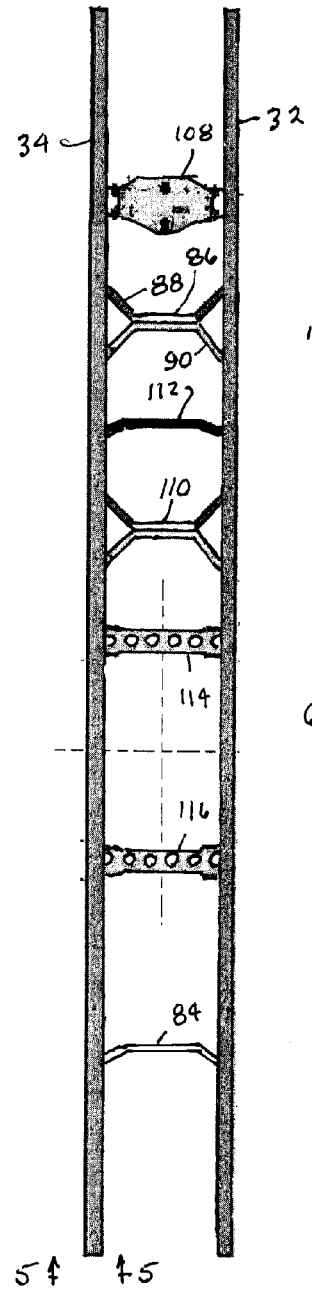
FIG. 4 is a top plan view of a portion of the chassis frame shown in FIG. 3, but with portions removed for the purpose of showing structure which is not seen in FIG. 3.

FIG. 4 shows a third crossmember 86 disposed between right side rail 32 and left side rail 34 at a lengthwise location between first crossmember 82 and second crossmember 84 and fastened in place by fasteners which pass through holes in both right side rail 32 and right uniting member 52 and by fasteners which pass through holes in both left side rail 34 and left uniting member 54.

Third crossmember 86 comprises two parts 88, 90. Each part comprises a central zone 92 (see FIGS. 6-8) which is fastened to the central zone of the other part. Each part comprises a pair of legs 94, 96 which diverge from each other in directions away from the central zone and which have free ends fastened to the side rails and uniting members as explained above. Each part 88, 90 may itself comprise multiple parts welded together.

FIG. 4 further shows a rear cab mount 108 disposed on, and fastened to, first crossmember 82, and fourth, fifth, sixth, and seventh crossmembers 112, 110, 114, 116 fastened to chassis frame 14. Fifth crossmember 110 has a construction like that of third crossmember 86 and is fastened in place in the same manner as third crossmember 86 by fasteners which pass through aligned holes in vertical flange 60 and vertical wall 36 and fasteners which pass through aligned holes in vertical flange 62 and vertical wall 38. Fasteners which fasten brackets 78, 80 to chassis frame 14 may also fasten sixth and seventh crossmembers 114, 116 in place.

A weldment 98 joins right lengthwise margin 66 of plate 64 to both right rectangular tube 48 and horizontal flange 56 of uniting member 52 along the length of the plate, and a weldment 100 joins left lengthwise margin 68 of plate 64 to both left rectangular tube 50 and horizontal flange 58 of uniting member 54 along the length of the plate. A weld 102 joins together vertical flange 60, 62 of the respective uniting member and the respective rectangular tube 48, 50. Fasteners which attach the crossmembers to chassis frame 14 aid in holding together each vertical flange 60, 62 and the respective vertical wall 36, 38 of the respective side rail 32, 34.

The respective vertical flange 60, 62 of each uniting member extends downwardly beyond the respective bottom wall 44, 46 of the respective side rail 32, 34, and each uniting member 52, 54 further comprises a respective underlying horizontal flange 104, 106 extending from the uniting member's vertical wall in underlying relation to the bottom wall of the respective side rail. Each underlying horizontal flange 104, 106 is spaced from and unattached to the respective bottom wall 44, 46 of the respective side rail. The presence of underlying horizontal flanges 104, 106 provides additional torsional rigidity to chassis frame 14, but they may be omitted for saving weight when a specification for torsional rigidity can be met without them.

Figure 2:
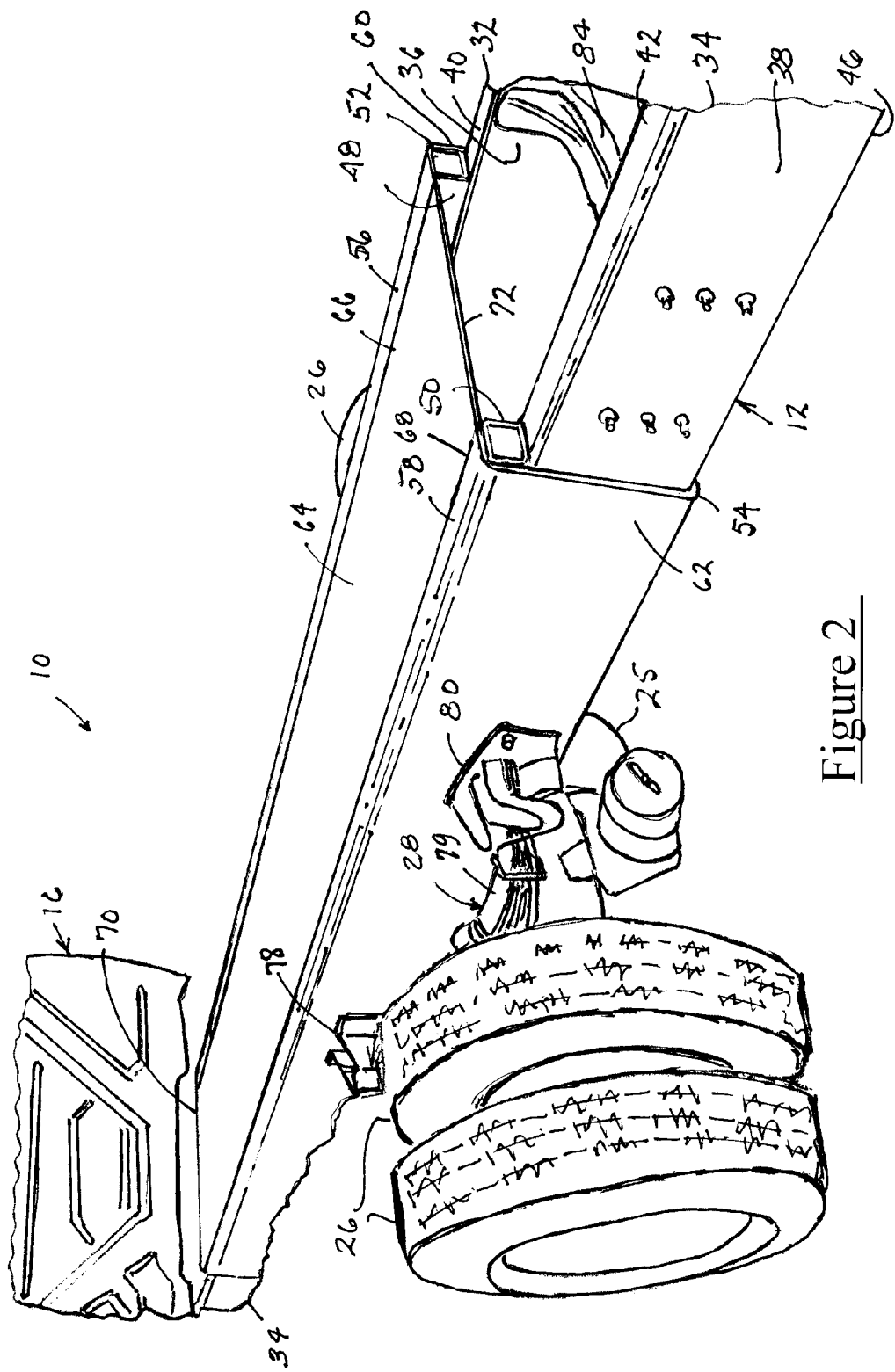
FIG. 2 is a perspective view of a portion of the cab chassis from the left rear.

FIG. 3 also comprises dimension lines 120, 122 indicating representative dimensions 4370 millimeters (length of plate 64) and 2218 millimeters respectively for one specific wheelbase and after-frame combination. A representative thickness of plate 64 is 0.25 inch. FIGS. 1 and 2 show forward lengthwise terminus 70 spaced slightly rearward of the rear of cab 16, a dimension of three inches being a representative distance.

Figure 5:
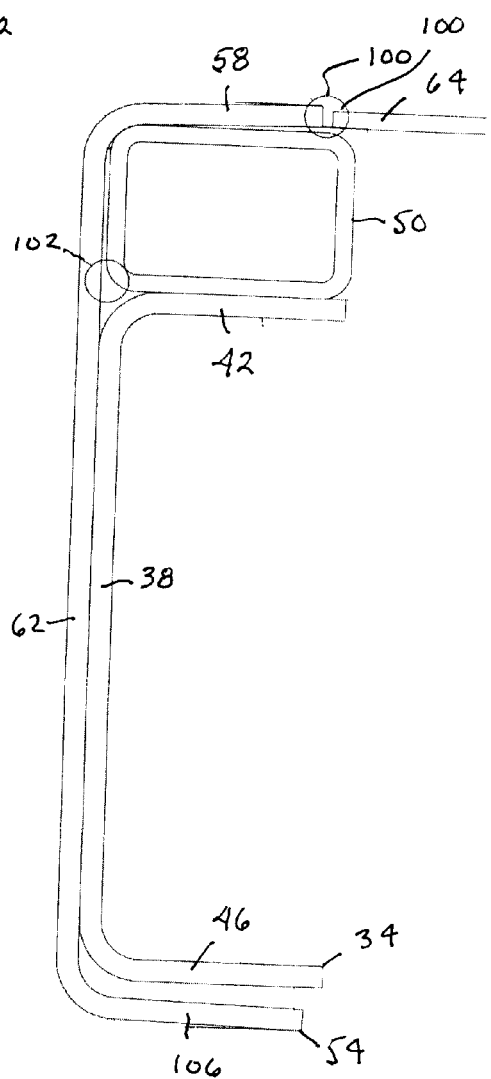
FIG. 5 is an end view in the direction of arrows 5-5 in FIG. 4 on a larger scale.
Figure 6:
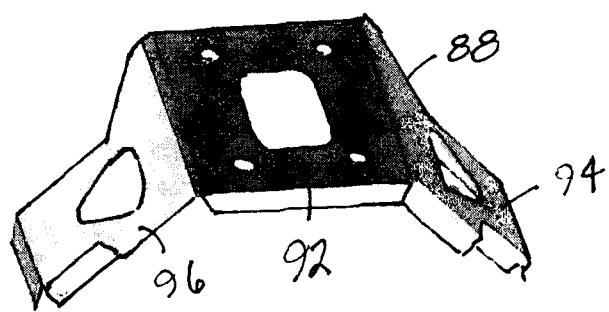
FIG. 6 is a perspective view of one part of the chassis frame shown by itself.
Figure 7:
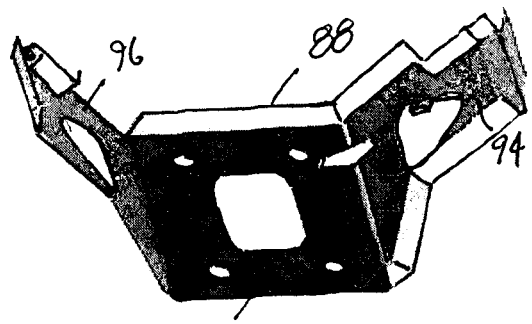
FIG. 7 is a perspective view of the part shown in FIG. 6 looking from a different direction.
Figure 8:
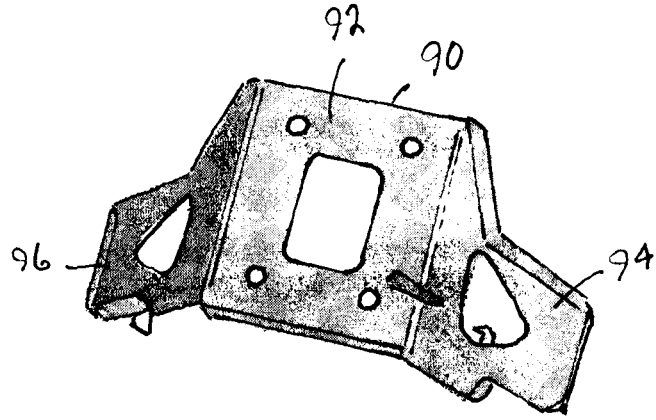
FIG. 8 is a perspective view of another part of the chassis frame shown by itself.

The side rails, the uniting members, the rectangular tubes, and the cross members are fabricated from suitable grades of steel. Representative dimensions of a rectangular tube are 3.50 inches by 2.50 inches, with 0.25 inch wall thickness. The process of fabricating the side rails and the uniting members may impart slight draft to the horizontal walls and flanges. Uniting member 52, as shown in FIG. 5, is an example of draft.

FIG. 4 does not show rectangular plate 64 or uniting members 52, 54. If those three parts and crossmembers 86 and 110 were omitted, and if the remaining crossmembers were fastened only to right side rail 32 and left side rail 34, such a chassis frame would be representative of a base chassis frame which is manufactured by an OEM vehicle manufacturer for potential use in any one of a number of different vocations. A purchaser of an OEM vehicle which has a chassis frame 14 that includes uniting members 52, 54 and rectangular plate 64 may choose to have crossmembers 86 and 110 installed by the OEM vehicle manufacturer.

FIGS. 9 and 10 show a modification which a purchaser may make to chassis frame 14 by cutting side rails 32, 34 between rearward lengthwise terminus 72 of plate 64 and crossmember 84 and welding opposite ends of a tubular crossmember 118 to the side rails. This shortens the overall length of chassis frame 14 for a particular vocational use which does not require the length shown in FIG. 3.

FIG. 11 shows a modification to the version of chassis frame 14 shown in FIGS. 9 and 10 when specified torsional rigidity can be satisfied by crossmembers 110A, 86A, which are like lighter crossmembers 114, 116, rather than heavier crossmembers 84, 86.

What is claimed is:

1. A chassis frame comprising:
a right side rail running lengthwise of the frame,
a left side rail running lengthwise of the frame,
the right and left side rails being opposite each other and joined together by at least one crossmember,
each side rail comprising a channel which has an interior bounded by a vertical wall and by horizontal top and bottom walls which extend from top and bottom of the vertical wall toward the top and bottom walls of the opposite side rail,
a right rectangular tube,
a left rectangular tube,
each rectangular tube overlying, and having underlying support by, the top wall of the respective side rail,
a right uniting member running lengthwise of the frame for uniting the right rectangular tube and the right side rail in assembly, and
a left uniting member running lengthwise of the frame for uniting the left rectangular tube and the left side rail in assembly,
each uniting member having a horizontal flange overlying and joined to the respective rectangular tube, and a vertical flange extending downward from the respective horizontal flange and joined to the respective side rail.

2. The chassis frame as set forth in claim 1 further comprising a plate which extends lengthwise of the frame, which has a lengthwise left margin overlying, and having underlying support by, the left rectangular tube, and which has a lengthwise right margin overlying, and having underlying support by, the right rectangular tube.

3. The chassis frame as set forth in claim 2 in which the side rails extend lengthwise forwardly beyond a forward lengthwise terminus of the plate, the rectangular tubes, and the uniting members, and further comprising a cab having an occupant compartment mounted on the side rails forwardly of the forward lengthwise terminus of the plate, the rectangular tubes, and the uniting members.

4. The chassis frame as set forth in claim 3 in which the side rails extend lengthwise rearwardly beyond a rearward lengthwise terminus of the plate, the rectangular tubes, and the uniting members.

5. The chassis frame as set forth in claim 4 further comprising a drive axle suspended from the frame by a suspension which comprises right side brackets disposed against the vertical flange of the right uniting member and fastened to the frame by fasteners passing through holes in the vertical flange of the right uniting member and the vertical wall of the right side rail and left side brackets disposed against the vertical flange of the left uniting member and fastened to the frame by fasteners passing through holes in the vertical flange of the left uniting member and the vertical wall of the left side rail.

6. The chassis frame as set forth in claim 4 in which a first crossmember is fastened to the right side rail and the left side rail at a lengthwise location forward of the forward lengthwise terminus of the plate, the rectangular tubes, and the uniting members, a second crossmember is fastened to the right side rail and the left side rail at a lengthwise location rearward of the rearward lengthwise terminus of the plate, the rectangular tubes, and the uniting members, and a third crossmember is disposed between the right side rail and the left side rail at a lengthwise location between the first crossmember and the second crossmember and is fastened in place by fasteners which pass through aligned holes in the right side rail and the right uniting member and by fasteners which pass through aligned holes in the left side rail and the left uniting member.

7. The chassis frame as set forth in claim 6 in which the third crossmember comprises two parts having central zones which are fastened together, each part comprising a pair of legs which diverge from each other in directions away from the central zone and which have free ends via which the two parts are fastened in place.

8. The chassis frame as set forth in claim 2 comprising a weldment which joins the lengthwise left margin of the plate to both the left rectangular tube and the top horizontal wall of the left side rail and a weldment which joins the lengthwise right margin of the plate to both the right rectangular tube and the top horizontal wall of the right side rail.

9. The chassis frame as set forth in claim 8 comprising fasteners which join together the vertical flange of each uniting member and the vertical wall of the respective side rail.

10. The chassis frame as set forth in claim 8 comprising a weld which joins together the vertical flange of each uniting member and the respective rectangular tube.

11. The chassis frame as set forth in claim 2 in which the vertical flange of each uniting member extends downwardly beyond the bottom wall of the respective side rail, and each uniting member further comprises an underlying horizontal flange extending from the uniting member's vertical wall in underlying relation to the bottom wall of the respective side rail.

12. The chassis frame as set forth in claim 11 in which each underlying horizontal flange is spaced from and unattached to the bottom wall of the respective side rail.

13. The chassis frame as set forth in claim 2 in which the side rails extend lengthwise forwardly beyond a forward lengthwise terminus of the plate, the rectangular tubes, and the uniting members, the frame comprises a cab mount crossmember located forwardly of the forward lengthwise terminus of the plate, the rectangular tubes, and the uniting members, and a cab having an occupant compartment is disposed on the frame forwardly of the forward lengthwise terminus of the plate, the rectangular tubes, and the uniting members, and is supported by a cab mount on the cab mount crossmember.

14. The chassis frame as set forth in claim 13 in which the frame comprises at least two more crossmembers disposed between the side rails rearward of the cab mount cross member.

15. The chassis frame as set forth in claim 14 in which at least one of the at least two more crossmembers is beneath the plate.

* * * * *